Sept. 12, 1967

E. LOWE ETAL 3,341,024

APPARATUS FOR MOLECULAR FILTRATION
AND METHODS FOR ITS FABRICATION

Filed Oct. 4, 1965

2 Sheets-Sheet 1

E. LOWE & E.L. DURKEE
INVENTORS

BY R. Hoffman
ATTORNEY a pool of water, $a$, on one side of a membrane and a pool of juice, $b$, on the other side of the membrane, water would flow in the direction $a \rightarrow b$ with the result that the juice
United States Patent Office 3,341,024
Patented Sept. 12, 1967

3,341,024
APPARATUS FOR MOLECULAR FILTRATION AND METHODS FOR ITS FABRICATION
Edison Lowe, El Cerrito, and Everett L. Durkee, El Sobrante, Calif., assignors to the United States of America as represented by the Secretary of Agriculture
Filed Oct. 4, 1965, Ser. No. 492,950
7 Claims. (Cl. 210—490)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel molecular filtration apparatus, useful in such applications, for example, as the de-watering of fruit juices whereby to produce juice concentrates. Another object is the provision of novel methods for fabricating apparatus for molecular filtration. Further objects and advantages of the invention will be evident from the following description taken in conjunction with the accompanying drawing.

Figure 1:
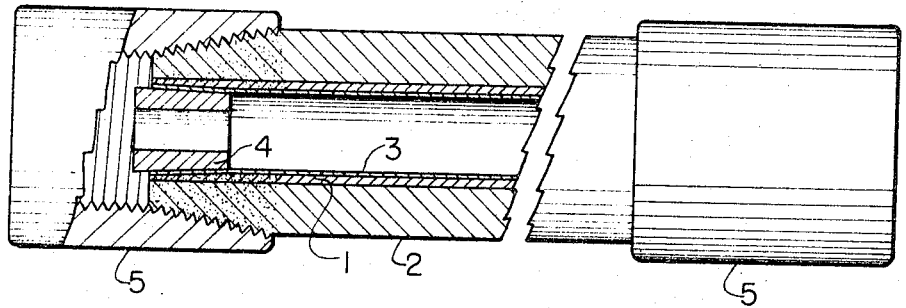
Figure 2:
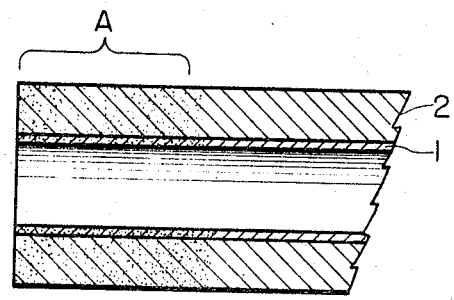
Figure 3:
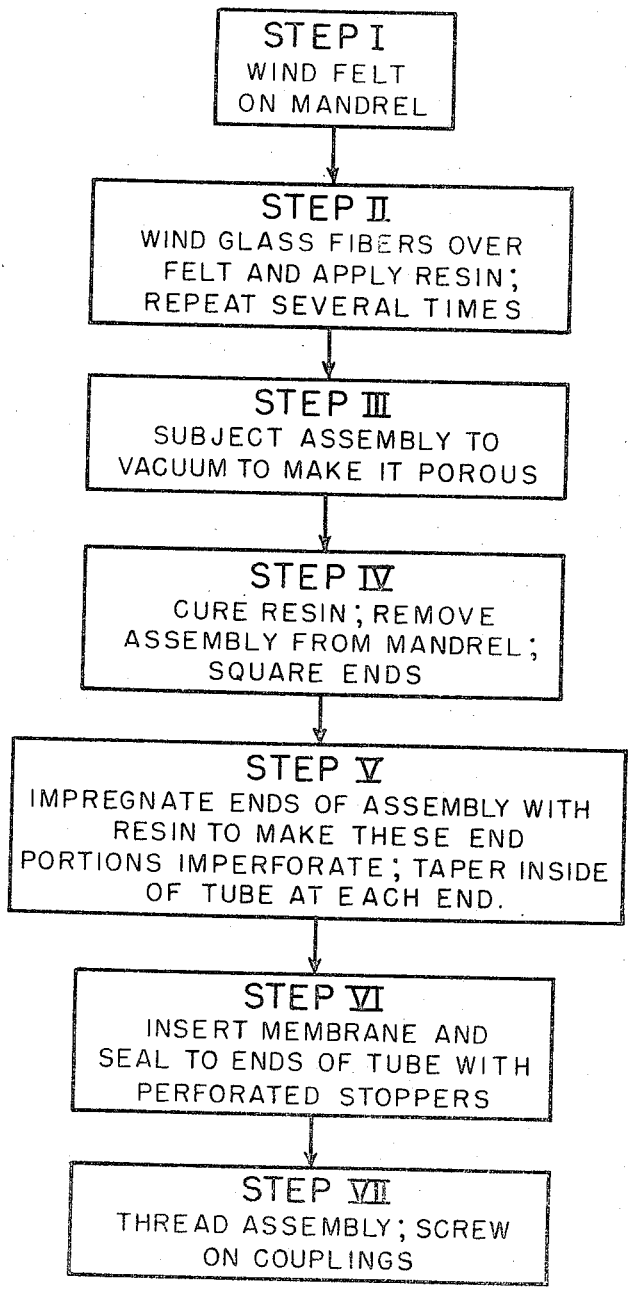

In the drawing, FIGURE 1 illustrates apparatus in accordance with the invention. In this figure, parts of the device have been broken away to shorten the illustration and to better disclose the internal construction. FIGURE 2 illustrates the apparatus in an intermediate stage of fabrication. FIGURE 3 is a diagram or flow-chart illustrating the steps in the process of the invention.

In order to place the invention in proper focus, it is of interest to contrast molecular filtration with the older process of ultrafiltration. Ultrafiltration is widely used to isolate colloids such as proteins from aqueous solutions or suspensions. Basically, ultrafiltration is like ordinary filtration through a screen or cloth except that in this case the filter is a semipermeable membrane such as a film of cellulose nitrate, regenerated cellulose, or the like. The solution to be treated is applied under pressure to one side of the membrane; the colloidal material remains on the upstream side of the membrane while water and crystalloids such as salts, sugars, etc. pass through the membrane. Although the semipermeable membranes used in ultrafiltration possess quite small pores, they will only prevent passage of colloids and other macromolecules; crystalloids such as acids, salts, sugars, and the like pass through these pores very readily. Consequently, application of ultrafiltration to a liquid food such as a fruit juice would accomplish no concentration. For example, if the juice was a clear liquid free from colloids, the entire juice would pass through the semipermeable membrane. If the juice contained colloidal material, the juice would merely be separated into a fraction of colloidal material and another fraction containing all the original water, acids, sugars, salts, flavor components, etc. In contrast, the apparatus of the invention utilizes special membranes which have the properties of (a) permitting the passage of water and (b) preventing the passage of crystalloids such as acids, salts, sugar, flavor components, etc. As a result, a true concentration is achieved. Because the separation technique utilized herein is at such a sophisticated level as to yield a separation of water from noncolloidal substances such as electrolytes and other crystalloids, it is termed "molecular filtration" to distinguish it from the relatively ancient art of ultrafiltration. The technique of the invention may also be termed "reverse osmosis" because the flow of water is opposite to that encountered in ordinary osmosis. This situation is further explained as follows: If an osmotic cell were set up containing a pool of water, $a$, on one side of a membrane and a pool of juice, $b$, on the other side of the membrane, water would flow in the direction $a \rightarrow b$ with the result that the juice would become more dilute. The driving force in such ordinary osmosis is the difference in concentration of dissolved material on the two sides of the membrane, and, in effect, the pressure is higher on the water side ($a$). In the process of the invention, on the other hand, a pressure greater than the osmotic pressure is applied on the more-concentrated side of the membrane ($b$), with the result that the osmotic pressure is overbalanced and the flow of water is $b$ to $a$, thereby causing the juice to become more concentrated than it was originally.

Recently it has been shown by Loeb et al. (U.S. Patents 3,133,132 and 3,133,137) that sea water can be desalinated by molecular filtration to prepare potable water, utilizing a special membrane which allows passage of water at a high flux rate while preventing passage of salt. Although the apparatus of Loeb et al. is suitable for pilot studies and for demonstrating the functions of the special membrane, it is not adapted for large-scale operations. Contributing to this deficiency is the following. The passages through which the starting liquid (e.g., salt water) is channelel are not conducive to uniform flow because of their angular and/or tortuous construction. This leads to localized areas of high solute concentration which are conducive to inadequate demineralization and to localized areas of low solute concentration which lead to inefficient utilization of the membrane filtration capacity. Another point is that the water flowing through the membrane does not pass directly out of the system but must flow through a considerable length of the porous backing of the membrane. This is likely to lead to back-pressures which will impede proper operation of the molecular filtration system.

It might readily be visualized that for large-scale industrial operations, it would be preferable if the membrane were shaped into a cylinder of relatively small diameter and long length and the liquid to be treated were pumped through the interior of this cylinder, thereby attaining a good scavenging action and avoiding any localized high or low concentrations of solute. It might further be visualized that if the cylindrical membrane were provided with a cylindrical porous backing or support, the water passing through the membrane would take a radial path through the porous backing and hence leave the system by a short path, consequently offering minimum back pressure.

A primary object of the present invention lies in the fabrication of apparatus which provides the advantages mentioned above. Referring to the drawing:

In Step I, porous sheet material such as felt, uncoated paper, woven or nonwoven fabric, etc. is formed into a tube 1. This is done, for example, by spirally winding a strip of the material onto a rod or pipe used as a mandrel. In the final device, the tube or layer 1 provides a resilient cushion for the membrane; it prevents the membrane from being forced into indentations of the supporting structure, hence prevents rupture of the membrane. Also, it served to distribute liquid passing through the membrane to the channels in the supporting structure.

Step II: On the tube of porous sheet material 1 is then formed a supporting structure 2 which is capable of resisting the high pressures used while enabling the escape of liquid which passes through the membrane (and through layer 1). In fabricating this supporting structure, a layer of glass fibers is formed over tube 1, for example, by spirally winding glass fiber yarns, tapes, or webs about tube 1. A resinous composition, such as an epoxy resin containing admixed curing agent, is then applied to the winding of glass fibers. To provide sufficient tensile strength to withstand the expected operating pressures—generally in the range of about 500 to 5000 lbs./sq. in.—the assembly is provided with a plurality of superimposed layers of glass fibers and resin. Depending on the working pressure, the type of fibers and resin used, etc. the number of fiber-resin layers in structure 2 may be anywhere from two to twelve or more. For best results, adjacent layers of glass fibers are wound in opposite directions, i.e., one spiraling to the right, the next to the left, and so on.

Step III: The assembly, now consisting of a mandrel and layers 1 and 2 superimposed thereon, is then placed in a chamber where it is exposed to vacuum to put the glass fiber-resin structure 2 into a porous condition so that it will permit passage of water which flows through the membrane when the device is in operation. It is believed that the structure is rendered porous by the action of the vacuum in causing an outward movement of minute bubbles of air normally enmeshed in the glass fibers, this outward movement leaving a series of mainly radial channels through the layers of viscous resinous material. The degree of vacuum used and the time of exposure thereto may be varied in accordance with the degree of porosity desired for a particular application of the device. In order to enhance the amount of porosity, a useful plan is to whip air into the resin composition and apply the resulting aerated resin to the layer of glass fibers. Then, when the vacuum is applied the air released from the resin will be added to that normally occluded in the fibers with the net result that the degree of porosity of the structure will be enhanced.

Step IV: After completing the vacuumizing operation, the assembly is treated to cure or set the resin to a solid state. Depending on the type of resin used, this may simply involve allowing the assembly to stand or applying heat to promote the setting. For example, epoxy and polyester resins are generally compounded with a curing agent which is effective at room temperatures so that with such resins, setting is accomplished simply by allowing to stand. However, one may also use, for example, phenol-formaldehyde, urea-formaldehyde, or other resinous compositions which require application of heat to convert them into a solid state. After the setting has been accomplished, the laminated assembly is removed from the mandrel and the ends squared off.

Step V: The assembly—now a rigid tubular structure having an inner layer 1 of felt or the like and an outer porous layer 2 of glass fibers and cured resin—is treated to make the ends of the assembly imperforate (nonporous). Typically, this is done as follows: One end of the assembly is plugged with a rubber stopper and tape is wound over the assembly to cover its outer surface completely except for about one inch at the plugged end. The assembly is then positioned vertically with the untaped end immersed in a conventional resinous composition such as an epoxy liquid containing admixed curing agent. Suction is applied to the bore extending through the assembly, whereby the resin is sucked into the end portion of the assembly. Thereby the interstices in the end portions of both felt layer 1 and glass fiber-resin layer 2 are filled with resin. This process is next repeated to render imperforate the opposite end of the assembly. The structure at this point is as depicted in FIG. 2 wherein the end portion of the assembly, indicated by A, is sealed with resin. The filling of the pores with resin is indicated by the dots in the illustrated cross-section.

In a next treatment, tapered pins are forced into each end of the assembly to compress the felt layer 1 into a tapered configuration. The assembly with the pins inserted is allowed to stand to cure and harden the applied resin. After this curing step the pins are removed. The assembly now has imperforate ends, depicted as the dotted and cross-hatched area A in FIG. 2, and the felt layer 1 has a slight inward taper at each end (note FIG. 1). The imperforate ends are required to prevent liquid from bypassing the membrane, i.e., flowing from the butt ends of layer 2 to the outer surface thereof. The taper at each end of layer 1 is provided simply to give a better seat for membrane-retaining stoppers 4, as explained below.

Step VI: The assembly is next provided with a membrane 3. Typically, the membrane may be in the form of a prefabricated seamless tube. This tubular membrane is inserted within the hollow core of the assembly. To make the membrane fit snugly against the inner walls of the tubular assembly, air or water under pressure may be applied into one end of the tubular membrane while the structure is held closed at the other end. Instead of using a prefabricated membrane, one may cast a membrane in place, that is, within the core of the tubular assembly, using techniques known in the art. Next, the ends of the membrane are sealed to the ends of the tubular support. This is conveniently done by inserting a perforated stopper 4 (made of rubber, Neoprene, or other elastomer) into each end of the tubular structure. Since stoppers 4 hold membrane 3 against the imperforate ends A of the assembly, liquid cannot by-pass the membrane when the system is in operation.

Step VII: The ends of the tubular structure are threaded and couplings 5 are screwed on snugly to provide pressure-tight connections. The structures are then ready for use. In a typical application, a number of the structures as described are connected end to end and the liquid to be treated, e.g., fruit juice, is pumped into one end of the system. The water flowing through the walls of the tubes is caught in a suitable receptacle such as a trough and discarded while the remaining liquid of increased solids content, i.e., a juice concentrate, flows out of the far end of the system.

In utilizing the apparatus of the invention for such applications as the concentration of liquid foods, typically fruit juices, it is necessary to employ a membrane having the appropriate characteristics as to both selectivity and flux. In regard to selectivity, the membrane must have the property of permitting the passage of water while offering maximum rejection (nonpassage) to nutrient, flavor, and color components. At the same time, the membrane must have high flux characteristics so that water can pass through it at a useful rate, thus to yield the desired concentrated product in a reasonable time of treatment. Membranes which meet these qualifications are known in the art and are disclosed by Loeb et al. (U.S. Patents 3,133,132 and 3,133,137). A critical item in the production of these membranes is that to the basic casting solution (typically, cellulose acetate dissolved in acetone) is added aqueous magnesium perchlorate. In typical production of these membranes, a solution is prepared containing 20% cellulose acetate, 10% water, 1 to 2% magnesium perchlorate, and the remainder acetone. This solution at about minus 10° C. is cast into a thin film by conventional casting techniques. After casting, the film is allowed to stand a short time, about 2 to 4 minutes, while maintained at the casting temperature to permit organization of the film and evaporation of part of the acetone. The film is then put in ice-water to extract acetone and the perchlorate from the film. The film is then heated in water to compact the gel structure, that is, to eliminate or at least greatly reduce any capillary structures. The heating of the film may be accomplished gradually by slowly raising the water preparation from the ambient up to about 80° C. or more rapidly by holding the film in water at 85–90° C. After the heat treatment the film is placed in water and kept therein until use, as drying would destroy its selective properties. Although magnesium perchlorate is generally used as the salt in the casting solution, one may use other compounds which have the capability of inducing binding of water with the cellulosic ester. Typical among these compounds are the perchlorates of calcium, lithium, copper, zinc, beryllium, etc., and thiocyanates, bromides, chlorides, etc. of polyvalent metals such as magnesium and calcium.

As evident from the foregoing description, the apparatus of the invention includes a membrane in seamless tubular form. A further object of this invention is the provision of novel procedures for preparing high-flux membranes which are permeable to water but essentially impermeable to nutrient, flavor, and color components of foods and which are in seamless tubular form. Such membranes are typically prepared in accordance with the invention in the following manner:

As the form or mold for casting the tubular membrane, glass tubing is preferred. For best results, this tubing should be of a precision-bored grade to provide a straight tube of uniform bore diameter, whereby to yield a final product of uniform thickness, considered both in the longitudinal and radial dimensions.

Step A: A piece of such tubing is cut to a length somewhat greater than the length of the support members (1 and 2 in FIG. 2). Into the tube is then poured a quantity of casting solution of the type described above. Then, a tool such as a ramrod is drawn through the tube to spread the solution uniformly in a longitudinal sense. Usually, initially an excess of solution is poured into the tube and in the longitudinal spreading operation, enough solution is left in the tube that after completion of the process the membrane will have a wall thickness of about 3 to 10 mils. This step may be conducted at reduced temperature but for convenience it is preferably conducted at ambient (room) temperature.

Step B: The glass tube now having the casting solution distributed uniformly along its length is stoppered at both ends and placed in the nip between two rollers rotating in the same direction, whereby the tube is spun about its axis at about 1200 r.p.m. This spinning is continued for a period long enough to spread the solution uniformly (now, in a radial sense). Such result generally requires, for example, spinning for at least 15 minutes where the speed of rotation is about 1200 r.p.m. This step may be conducted at reduced temperature but for convenience it is preferably carried out at ambient (room) temperature.

Step C: The glass tube now having the casting solution distributed uniformly over its inner walls is removed from the spinning device. The stoppers at the ends of the tube are removed, the tube is placed back on the spinning rollers, and a stream of air at a very low flow-rate is passed through the tube to evaporate part of the acetone contained in the casting solution. For best results—i.e., uniform reduction in acetone content along the length of the cast film—the flow of air is first conducted in one direction through the tube, then reversed and passed through the tube in the other direction. The air stream and/or the tube may be held at reduced temperatures but for convenience it is preferred to conduct the step at ambient (room) temperature. The amount of evaporation to be effectuated is best judged by conducting trials on pilot samples, using different times and/or flow-rates of air to select the conditions which provide such degree of evaporation that when the assembly is plunged into ice-water there is formed a film which is clear but slightly milky. The film should not be opaque, this being an indication of inadequate acetone removal, nor should it be completely clear as occurs when too much acetone has been evaporated.

Step D: The assembly is then put in ice-water to extract perchlorate and remaining acetone from the film. At this point the film is self-supporting and can be easily slipped out of the glass tube on which it was formed.

Step E: The film is then heated in hot water to compact its gel structure and to reduce any capillary structures. In typical operation, the film is held in water at 85–95° C. for a short period of time, for example, 10 minutes at 86° C. Following this heating step, the film is cooled by placing it in cold water and it is then ready for use as the membrane in the molecular filtration apparatus. If the film is to be held before use, it is kept in water to prevent it from drying out and thereby losing its selective properties.

The molecular filtration apparatus described herein is of wide applicability and can be utilized for the concentration of liquid foods of all kinds. Typical liquids which may be concentrated are listed below solely by way of example and not limitation:

Fruit and Vegetable Products: Juices, extracts, pulps, purees, and similar liquid products derived from fruits or vegetables such as orange, grapefruit, lemon, lime, apple, pear, apricot, strawberry, raspberry, cranberry, pineapple, grape, prune, plum, peach, cherry, tomato, celery, carrot, spinach, onion, lettuce, cabbage, potato, sweetpotato, watercress, etc. The liquid products may be prepared in customary manner by subjecting edible portions of the produce to such operations as reaming, pressing, macerating, crushing, comminuting, extracting with water, cooking, steaming, etc. These operations may be applied to the fresh produce or to processed produce, that is, produce which has been subjected to such operations as cooking, blanching, freezing, canning, sun-drying, sulphiting, or preservation by application of chemical preservatives or ionizing radiations.

Meat and Fish Products: Meat extracts, meat juices, soups or broths made from meat or fish products with or without added vegetative material, clam juice, oyster stew, fish or clam chowders, etc.

Lacteal Products: Whole milk, skim milk, whey, cream, buttermilk, yogurt, milk products containing such additives as chocolate, cocoa, sugar, malt, vitamins, sugar, etc.

Cereal Products: Aqueous extracts of cereals such as wheat, barley, malted barley, rice, corn, etc.

Beverages: Aqueous extracts of coffee, tea, chocolate, yerba mate, roasted cereal products (simulated coffee products), etc.

Carbohydrate Substances: Honey, maple syrup, corn syrup, sorghum syrup, molasses, etc.

Egg Products: Egg white, egg yolk, whole egg, or preparations of egg with other foods such as milk, cream, sugar, flavorings, etc.

Miscellaneous: Juices, extracts, purees and other liquid products made from alfalfa, clover, grasses, cottonseed or soybean meals, sugar cane, sugar beet, sorghum, animal blood, etc. Vitamin preparations such as solutions of ascorbic acid, thiamin or other vitamins, vitamin concentrates or precursors, fermentation products such as beers (culture liquors) containing mushroom mycelium, yeasts, biosynthesized vitamins, etc.

It is obvious that the conditions applied during the molecular filtration—for example, the pressure, the time of exposure of the liquid to the membrane, the area of membrane provided, etc.—may be varied to attain a concentrate of the desired solids content. If a concentrate of relatively high solids content is desired as the end product the conditions are adjusted (for example, the exposure time and/or the area of membrane are increased) to achieve a high degree of de-watering. Conversely, if a product of relatively low solids content is desired the conditions are selected to attain a lesser degree of de-watering (for example, the exposure time and/or membrane area are decreased). By way of example but not limitation, when fruit juices are subjected to the process of the invention they may be concentrated to a level of about 40 to 60% solids to yield products to be preserved by freezing, canning, or other conventional treatment, or they may be concentrated to higher levels of solids content, say 75 to 85%, to attain self-preserving concentrates. It is evident from the above that selection of the degree of concentration is not a critical factor but simply depends on the kind of product desired by the operator.

The liquid food to which the process is applied need not necessarily be a true solution but may contain suspended matter in addition to dissolved matter. The process is thus generically applicable to the concentration of any food in a liquid state, the term "liquid" being used in the sense of including any physical form which is capable of flowing. Generally, when the starting material contains undissolved matter, for example, cellular fragments or other fibrous material, pectin, oils, or the like, it is preferred to temporarily remove this material by screening, centrifugation, or the like, and then blend it back with the clarified juice after the latter has been subjected to concentration by molecular filtration.

It may be observed that no claim is made herein relative to novelty in the process of concentrating liquid foods by molecular filtration (reverse osmosis); this is the subject of the copending application of A. I. Morgan, Jr., Serial No. 423,613 filed January 5, 1965.

The invention is further demonstrated by the following illustrative examples.

EXAMPLE 1

Wool felt strip, 1 inch wide, was spirally wound on a ½ inch diameter mandrel. Woven glass fiber tape, 1.5 inches wide and 15 mils thick, was spirally wound over the felt in the opposite direction. A conventional epoxy resin (settable at room temperature) was then coated onto the glass fiber winding. Application of the glass fibers and resin was repeated, with opposite direction of winding for each layer, for a total of ten layers of resin-coated glass fibers. The entire assembly was placed in a chamber where it was held under a pressure of about 29 in. Hg for 10 to 15 minutes. The assembly was then removed from the vacuum chamber and allowed to stand until the resin had set. The assembly was then removed from the mandrel and the ends squared off. The ends of the assembly were made imperforate by stopping up one end, taping the side of the structure except for the last inch, dipping the untaped, plugged end into a bath of the same epoxy liquid as used before, and applying vacuum to the hollow core of the structure, whereby to suck the resin into the end of the structure. This procedure was repeated to render imperforate the opposite end. Tapered drift pins were then inserted into each end of the assembly to compress the felt layer to a tapered configuration and the device was allowed to stand until the resin had hardened. The drift pins were removed and a seamless tubular membrane was inserted into the hollow core and sealed in place by inserting a perforated rubber stopper in each end. The tubes were threaded, and couplings were screwed on. The apparatus was then tested by plugging up one end and pumping water into the other. It was found that the particular membrane used ruptured at 2500 lbs./sq. in. but the supporting tube itself was able to withstand pressures of 5000 lbs./sq. in. without any damage.

EXAMPLE 2

A casting solution was prepared containing:

|  | Percent |
|---|---|
| Cellulose acetate | 22.2 |
| Acetone | 66.7 |
| Water | 10.0 |
| Magnesium perchlorate | 1.1 |

A quantity of this solution was poured into a one-foot section of 0.5 in. ID precision-bored glass tubing and drawn with a rod along the length of the tube to spread it uniformly in the longitudinal dimension of the tube. The tube was then capped at each end and spun about its axis at about 1200 r.p.m. for 20 minutes to distribute the solution uniformly in the radial sense. The tube was then uncapped and a very gentle stream of air, at room temperature, was passed through the tube for one minute in one direction, then for the same time in the opposite direction. The tube was immersed in ice-water and moved about in the water to promote leaching of perchlorate and residual acetone from the film. The film was then withdrawn from the glass tube. It was observed to have a wall thickness of 4 mils, it was clear with a tinge of milkiness and was self-supporting and quite rigid. It was heat-cured for 10 minutes in water at 86° C., then utilized as the membrane in a structure fabricated as described in Example 1. The completed structure was found to be useful for preparing concentrated apple juice by pumping single-strength (14° Brix) apple juice through the hollow core of the apparatus at a pressure of 1000 p.s.i.g.

Having thus described the invention, what is claimed is:

1. A method for fabricating apparatus for filtration which comprises forming porous sheet material into a tube, winding about said tube a plurality of superimposed layers of glass fibers, coating each of said layers with a liquid resin composition, subjecting the resulting laminated assembly to vacuum to develop porosity through the glass fiber-resin structure, setting the resin, drawing a sealing material into the ends of the assembly to render these end portions imperforate, installing a tubular membrane within the tube and sealing the ends of the membrane against the inner walls of the imperforate ends of the tube.

2. The method of claim 1 wherein the liquid resin composition is in a gasified condition when applied to the glass fibers.

3. The method of claim 1 wherein air is whipped into the liquid resin composition and the resulting aerated resin composition is applied to the glass fibers.

4. The method of claim 1 wherein the tubular membrane is prepared by providing a tubular mold, spreading a casting solution within the mold and uniformly along the length of the mold, spinning the mold about its axis to distribute the casting solution uniformly in the radial sense, passing a current of air through said tubular mold first in one direction, then in the opposite direction to attain uniform evaporation of part of the solvent contained in the casting solution, washing the film formed within the mold, removing it from the mold, and hardening it by treatment in hot water.

5. The method of claim 4 wherein the casting solution contains a cellulose ester, a volatile organic solvent, water, and a perchlorate salt.

6. A tubular laminated structure for use in conducting filtration comprising, in combination, a tube of porous cushioning material, a surrounding porous support composed of a plurality of plies of glass fiber each impregnated with a resin, said structure having imperforate ends impervious to liquids, a seamless tubular membrane within the cushioning tube, and expanded sleeves sealing the ends of the membrane to the inner wall of the imperforate ends of said structure.

7. The structure of claim 6 wherein the tubular membrane is one produced by centrifugal casting of a solution of a cellulose ester, a volatile organic solvent, water, and a perchlorate salt.

References Cited

UNITED STATES PATENTS

| 2,687,997 | 8/1954 | Marchand | 210—321 |
| 2,824,033 | 2/1958 | Donaldson | 264—311 X |
| 3,017,670 | 1/1962 | Zweig | 264—311 |
| 3,133,132 | 5/1964 | Loeb et al. | |
| 3,133,137 | 5/1964 | Loeb et al. | 264—41 |
| 3,170,867 | 2/1965 | Loeb et al. | 210—500 X |
| 3,187,381 | 6/1965 | Britten | 264—311 X |

FOREIGN PATENTS

| 295,120 | 4/1965 | Netherlands. |

OTHER REFERENCES

Design and Construction of a Desalinization Pilot Plant (A Reverse Osmosis Process), by Aerojet General Corp., U.S. Dept. of Interior, Office of Saline Water. R and D Progress Report No. 86, PB 181574, Apr. 10, 1964, pp. 13, 14.

McGlone et al.: Porous Reinforced Plastic Laminates, in SPE Journal, April 1964, pp. 369–373.

New Osmotic Process of Saline Water Conversion, in Water and Water Engineering, October 1964, pp. 414–415.

Reverse Osmosis Unit Desalts Water for City Mains, in Chem. Eng., Apr. 2, 1965, p. 62.

REUBEN FRIEDMAN, *Primary Examiner.*

D. RIESS, *Assistant Examiner.*